United States Patent [19]
Owen et al.

[11] 3,974,063
[45] Aug. 10, 1976

[54] DENITROGENATING AND UPGRADING OF HIGH NITROGEN CONTAINING HYDROCARBON STOCKS WITH LOW MOLECULAR WEIGHT CARBON-HYDROGEN FRAGMENT CONTRIBUTORS

[75] Inventors: Hartley Owen, Belle Mead; Edward J. Rosinski, Deptford; Paul B. Venuto, Cherry Hill, all of N.J.

[73] Assignee: Mobil Oil Corporation, New York, N.Y.

[22] Filed: Oct. 17, 1974

[21] Appl. No.: 515,778

[52] U.S. Cl. ............................ 208/120; 208/254 R; 260/668 R; 260/673
[51] Int. Cl.² .................... B01J 8/24; C01B 29/28; C10G 11/02
[58] Field of Search ............. 208/120, 254 R, 254 H

[56] References Cited
UNITED STATES PATENTS

| | | | |
|---|---|---|---|
| 3,506,731 | 4/1970 | Frilette et al. | 260/672 |
| 3,533,936 | 10/1970 | Weisz | 208/56 |
| 3,592,760 | 7/1971 | Young | 208/111 |
| 3,617,496 | 11/1971 | Bryson et al. | 208/80 |
| 3,669,873 | 6/1972 | Jaffe et al. | 208/59 |
| 3,830,724 | 11/1974 | Schutt | 208/111 |
| 3,849,291 | 11/1974 | Owen | 208/78 |
| 3,886,060 | 5/1975 | Owen | 208/120 |
| 3,894,107 | 7/1975 | Butter et al. | 260/668 R |
| 3,894,936 | 7/1975 | Owen | 208/78 |

*Primary Examiner*—Delbert E. Gantz
*Assistant Examiner*—G. E. Schmitkons
*Attorney, Agent, or Firm*—Charles A. Huggett; Carl D. Farnsworth

[57] ABSTRACT

A method is described for converting nitrogen containing oil stock such as shale oil syncrudes or other stocks of high nitrogen level by cracking in the presence of $C_2$ to $C_5$ hydrocarbons and/or methanol with an acidic zeolite cracking catalyst. Cocracking of the high nitrogen stock with the carbon-hydrogen contributors provides appreciable denitrogenation of the charge thus decreasing the need for hydroprocessing the charge with attendant savings in operating costs.

8 Claims, 1 Drawing Figure

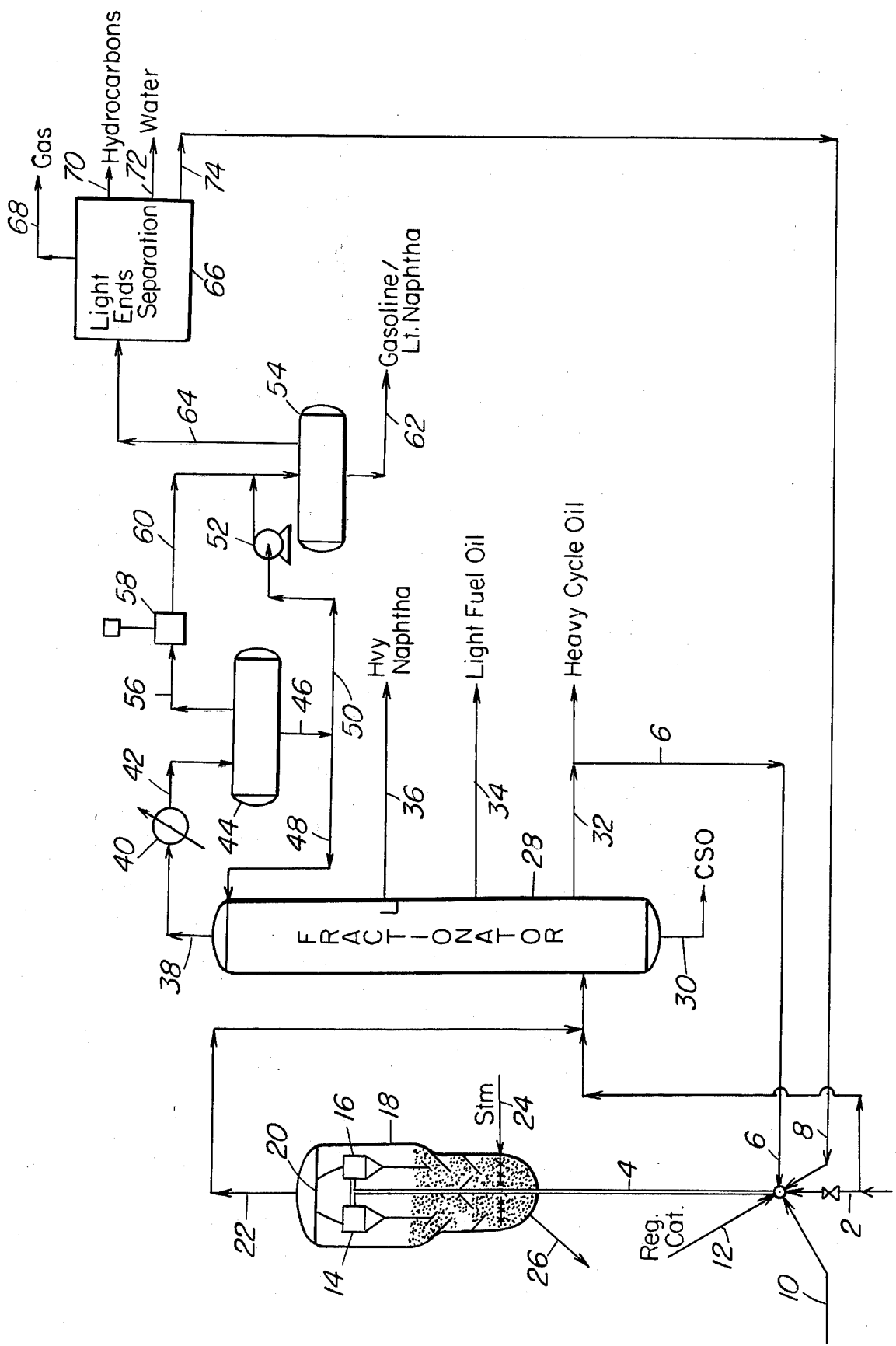

DENITROGENATING AND UPGRADING OF HIGH NITROGEN CONTAINING HYDROCARBON STOCKS WITH LOW MOLECULAR WEIGHT CARBON-HYDROGEN FRAGMENT CONTRIBUTORS

RELATED APPLICATION

This application is related to application Ser. No. 473,608 filed May 28, 1874.

BACKGROUND OF THE INVENTION

It is known in the prior art to upgrade hydrogen deficient petroleum oils to more valuable products by thermal and catalytic cracking operations in admixture with a hydrogen donor diluent material. The hydrogen donor diluent is a material, aromatic-naphthenic in nature that has the ability to take up hydrogen in a hydrogenation zone and to readily release hydrogen to a hydrogen deficient oil in a thermal or catalytic cracking operation.

One advantage of a hydrogen donor diluent operation is that it can be relied upon to convert heavy oils or hydrogen deficient oils at relatively high conversions in the presence of catalytic agents with reduced coke formation. Coke as formed during the cracking operation is usually a hydrocarbonaceous material sometimes referred to as a polymer of highly condensed, hydrogen poor hydrocarbons.

Catalytic cracking systems in use today have taken advantage of new catalyst developments, that is, the use of crystalline zeolite cracking catalysts in preference to the earlier used amorphous silica-alumina cracking catalyst. These new crystalline zeolite cracking catalysts are generally regarded as low coke producing catalysts and have also been found to exercise greater hydrogen transfer activity than the known amorphous silica-alumina cracking catalyst. Thus as the level of coke deposits has been reduced through the use of the crystalline zeolite it has been equally important to concentrate in recovering the maximum amount of heat available through the burning of deposited coke. However, when operating a catalytic cracking process within optimum conditions provided by the crystalline zeolite conversion catalysts, the petroleum refiner is still faced with operating a hydrogen deficient process which does not permit the most optimistic recovery of desired products.

One of the major problems facing refineries in the processing of syncrudes derived from oil shale is the handling of process down-stream of high levels of nitrogen. Nitrogen-containing organic compounds are distributed in various fractions over a broad portion of the shale oil syncrude boiling range. One of their major effects is to poison FCC catalysts, significantly lowering the effective conversion. Similarly, high levels of nitrogen are found in certain petroleum crude stocks, such as the highly naphthenic California coastal crudes. Generally, an appreciable fraction of the nitrogen in such high-nitrogen stocks is contained in the organic structural environment of aromatic-type 5- and 6-membered condensed (polynuclear) heterocyclic rings. Quinoline, indole, carbazol, etc. are some generic representatives of these classes of molecule.

SUMMARY OF THE INVENTION

The present invention is concerned with providing mobile hydrogen alone or combined with carbon in molecular fragments in a crystalline zeolite hydrocarbon conversion operation in such amounts that the yield of desired hydrocarbon product will be simultaneously increased. In a more particular aspect the present invention is concerned with providing hydrogen contributing materials and/or carbon-hydrogen molecular fragments to a catalytic cracking operation which are lower boiling than a high molecular weight hydrocarbon charged to the cracking operation. In yet another aspect the present invention is concerned with providing the hydrocarbon conversion operation with one or more crystalline zeolite catalytic materials which will promote chemical reactions with mobile hydrogen and/or carbon-hydrogen molecular fragments in addition to promoting catalytic cracking reaction to provide useful products contributing to gasoline boiling range material.

In the present invention a "low molecular weight carbon-hydrogen contributing material" and a "high nitrogen feedstock" are intimately mixed with one another and converted with a crystalline zeolite catalyst comprising an acid function, wherein cracking and additive carbon-hydrogen reactions occur to produce products of lower levels of nitrogen than those formed in the absence of the "low molecular weight carbon-hydrogen contributing material". The cracking reactions may occur in the presence of a hydrogen activating function before, during or after exposure of the mixture to the zeolite catalyst with hydrogen-transfer activity.

By "high nitrogen stock" is meant any $C_5+$ petroleum-type stock (i.e., that boils in the gasoline boiling range or higher) which has high enough nitrogen levels to be associated with catalyst poisoning, product instability or other problems known in the art in downstream processing. Such stocks include syncrudes from oil shale processing, or any fraction from such a syncrude, fractions from high-nitrogen California coastal crudes, or any stock with high nitrogen levels. High nitrogen containing stock are those comprising at least 1400 ppm or about 0.14 weight percent of nitrogen.

A particular advantage of the reaction concepts of this invention is that they occur at low pressures (i.e. at pressures commonly employed in current catalytic cracking operations or slightly higher). It is most preferred that the reactions be performed in fluidized catalyst systems (risers, dense beds, etc.), but they can also be practiced in some fixed catalyst bed arrangements or moving bed catalytic systems. The reactions described herein may occur in one stage of operation all at the same process conditions, or in a sequence of two or more stages of operation, at the same or different process conditions. Further, the catalyst functions referred to herein may be on the same catalytic particle, or on different catalyst particles such as a mixture of crystalline zeolite catalytic materials.

Some specific advantages derivable from the improved process concept of this invention include improved crackability of heavy feedstocks, increased gasoline yield and/or gasoline quality (including octane and volatility), and fuel oil fractions of improved yield and/or burning quality and lower levels of potentially polluting impurities such as sulfur and nitrogen. The need for costly high pressure hydrotreaters and hydrocrackers using expensive molecular hydrogen rich gas can thus be eliminated, or the severity requirements of the operation greatly decreased, thus saving considerable capital investment and operating costs.

By "low molecular weight carbon-hydrogen contributing material" is meant materials comprising a lesser number of carbon atoms than found in materials within the gasoline boiling range and preferably those materials containing 5 or less carbon atoms that fit into any of the categories of:

a. Hydrogen-rich molecules, i.e. molecules with wt.% H ranging from about 13.0–25.0 wt.%. This may include light paraffins, i.e. $CH_4$, $C_2H_6$, $C_3H_8$ and other materials.

b. A hydrogen donor molecule, i.e. a molecule whose chemical structure permits or favors intermolecular hydrogen transfer. This includes $CH_3OH$, other low boiling alcohols such as ethanol, n-propanol, isopropanol, n-butanol, isobutanol, etc., aliphatic ethers, other oxygen compounds (acetals, aldehydes, ketones) certain sulfur, nitrogen and halogenated compounds. These would include $C_2$-$C_5$ aliphatic mercaptans, disulfides, thioethers, primary, secondary, tertiary amines and alkylammonium compounds, and haloalkanes such as methyl chloride etc.

c. Reactants that chemically combine to generate hydrogen donors or "active" or "nascent" hydrogen, i.e. carbon monoxide, CO, especially CO + $H_2O$, CO + $H_2$, CO + alcohol, CO + olefin, etc. A catalyst with a hydrogen activating function is preferred when carbon monoxide is in the feed and required when a light paraffin is in the feed.

d. Secondary Reaction Products from materials in categories (a), (b), or (c) above that are hydrogen donors themselves, or transfer hydrogen, or become involved in intermolecular hydrogen transfer in which hydrogen redistribution occurs. This includes olefins, naphthenes, or paraffins.

e. Classes of materials which are structurally or chemically equivalent to those of category (d), notably olefins, etc.

f. A combination of any or all of the materials in categories (a) through (e).

g. A preferred low molecular weight material includes methanol and $C_2$-$C_5$ olefins.

By "high molecular weight feedstock" is meant any material that boils higher than a conventional gasoline end boiling point, i.e. about 11–12 C-number or higher. It is especially preferred that "high molecular weight feedstocks" include catalytic cracking feeds or potential feeds therefor such as distillate gas oils, heavy vacuum gas oils, atmospheric resids, syncrudes (from shale oil, tar sands, coal), pulverized coal and combinations thereof.

By catalyst with a "cracking or acid function" is meant an acidic composition, most preferably a solid, such as a crystalline zeolite cracking catalyst and combinations thereof. A preferred composition includes a crystalline zeolite component (or components) intimately dispersed in a matrix.

By catalyst with a "hydrogen-activating function" is meant one of several classes of catalysts which aid in the redistribution or transfer of hydrogen, or which are classified as hydrogen dissociation, hydrogen activation, or hydrogenation catalysts. The catalyst with a "hydrogen-activating function" may or may not contain a metal function. Some of the preferred metal functions are Pt, Ni, Fe, Co, Cr, Th, (or other metal function capable of catalyzing the Fischer-Tropsch or water-gas shift reaction), or Re, W, Mo or other metal function capable of catalyzing olefin disproportionation.

The term "hydrogen transfer" is known in the art of catalytic conversion to characterize the ability to transfer hydrogen other than molecular hydrogen from one type of hydrocarbon to another with a catalyst particularly promoting the transfer. This type of chemical reaction is to be contrasted with hydrogenation catalysts or catalyst components capable of attaching hydrogen to an olefin from gaseous molecular hydrogen.

A group of highly active catalysts particularly suitable for use in the practice of the present invention are zeolitic crystalline aluminosilicates of either natural or synthetic origin having an ordered crystal structure. These crystalline zeolite materials are possessed with a high surface area per gram and are microporous. The ordered structure gives rise to a definite pore size of several different forms. For example, the crystalline zeolite may comprise one having an average pore size of about 5A such as Linde 5A or chabasite or it may be an erionite or an offretite type of crystalline zeolite. A crystalline zeolite with a pore size in the range of 8-15-A pore size such as a crystalline zeolite of the "X" or "Y" faujasite type of crystalline material may be used. Mordenite and ZSM-5 type of crystalline aluminosilicates may also be employed. In the process of the present invention it is preferred to use crystalline zeolites having a pore size sufficiently large to afford entry and egress of desired reactant molecules. Thus, the catalyst may be a relatively large pore crystalline zeolite such as an "X" or "Y" faujasite variety or an intermediate pore size material such as mordenite. It may be a mixture of large and smaller pore crystalline zeolites. In this regard the mixed crystalline aluminosilicates used in the method of this invention will provide a pore size spread greater than 4 and less than 15 Angstrom units. The smaller pore zeolite portion of the catalyst may be provided by erionite, offretite, mordenite and ZSM-5 type of crystalline zeolite. Methods of preparing these various crystalline zeolites are the subject of numerous patents now available.

The aluminosilicate active components of the catalyst composite may be varied within relatively wide limits as to the crystalline aluminosilicate employed, cation character, concentration as well as in any added component by precipitation, adsorption and the like. Particularly, important variables of the zeolites employed include the silica-alumina ratio, pore diameter and spatial arrangement of cations.

The crystalline aluminosilicate or crystalline zeolites suitable for use in the present invention may be modified in activity by mixing with a matrix material of significant or little catalytic activity. It may be one providing a synergistic effect as by large molecule cracking, large pore material and act as a coke sink. Catalytically active inorganic oxide matrix material is particularly desired because of its porosity, attrition resistance and stability under the cracking reaction conditions encountered particularly in a fluid catalyst cracking operation. Inorganic oxide gels suitable for this purpose are fully disclosed in U.S. Pat. No. 3,140,253 issued July 7, 1964 and such disclosure is incorporated herein by reference.

The catalytically active inorganic oxide may be combined with a raw or natural clay, a calcined clay, or a clay which has been chemically treated with an acid or an alkali medium or both. The catalyst may also be provided with an amount of iron and/or nickel which materials are known to promote the Fischer-Tropsch reaction. The matrix material is combined with the crystalline aluminosilicate in such proportions that the resulting product contains a minor proportion of up to about 40% by weight of the aluminosilicate material and preferably from about 1% up to about 35 weight percent thereof may be employed in the final composite.

The mobile hydrogen component of the reaction mixture of the present invention may be provided from several different sources, such as the high molecular weight feed and the low molecular weight material, it being preferred to obtain hydrogen moieties from gasiform and vaporous component materials occurring in the operation lower boiling than the hydrocarbon material charged to the cracking operation. Thus, it is proposed to obtain the hydrogen moieties suitable for hydrogen distribution reactions from component and component mixtures selected from the group comprising methanol, dimethylether, CO and water, carbon monoxide and hydrogen, $CH_3SH$, $CH_3NH_2$, $(CH_3)_2NH$, $(CH_3)_3N$, $(CH_3)_4N$ and $CH_3X$, where X is a halide such as fluorine, bromine, chlorine and iodine. Of these hydrogen contributing materials it is preferred to use methanol alone or in combination with either CO alone, or CO and water together. On the other hand, it is contemplated combining light olefinic gaseous products found in pyrolysis gas and the products of catalytic cracking such as ethylene, propylene and butylene with the hydrogen and/or carbon hydrogen contributing material. In any of these combinations, it is preferred that the mobile hydrogen or the carbon-hydrogen fraction be the product of one or more chemical reactions particularly promoted by a relatively small pore crystalline zeolite such as a ZSM-5 type of crystalline zeolite or a small pore modenite type zeolite. Methanol is a readily available commodity obtained from CO and $H_2$ synthesis, coal gasification, natural gas conversion, and other known sources.

The hydrocarbon feeds which may be processed in the cracking operation of this invention may be any heavy petroleum fraction such as atmospheric gas oil, and particularly high nitrogen containing stocks such as vacuum gas oils, atmospheric and vacuum resids, synthetic crudes derived from oil shale, tar sands, coal and solvent refined coal. In short, any hydrogen deficient feedstock and preferably one that would require a more conventional high pressure hydrocracking and hydrotreating operation to render the feed suitable for use in a fluid catalytic cracking operation can be used in the method of this invention.

Current practice for upgrading high molecular weight, hydrogen-deficient, high-impurity refinery stocks generally involves either hydrotreating followed by catalytic cracking, or hydrocracking, both of which involve the use of costly gaseous hydrogen at high pressures (i.e. 500–3000 psig), in expensive, high-pressure process units. Alternatively some poor quality stocks are catalytically cracked alone with low quality product being produced which requires extensive upgrading or dilution before becoming saleable. Some of these processes often require expensive gas compressors and complex heat transfer or hydrogen-quenching systems. In addition, although these processes improve conversion and product yields, significant losses in gasoline octane are often incurred, requiring a subsequent reforming step to upgrade gasoline quality.

The current concept employs a fluidized catalyst system at low pressures without the need for high pressure hydrogen gas. Such a system promotes the highly efficient contact of relatively inexpensive hydrogen contributing low molecular weight materials with heavy, refractory molecules in the presence of high-surface area cracking catalyst with or without "hydrogen-activating catalyst functions". Intermolecular hydrogen-transfer interactions and catalytic cracking reactions effected in the presence of fluidized catalyst particles minimize problems due to diffusion/mass transport limitations and/or heat transfer.

The concepts of the present invention make use of relatively cheap, low molecular weight hydrogen contributors readily available in petroleum refineries, such as light gas fractions, light olefins, low boiling liquid streams, etc. It also makes particular use of methanol, a product which is readily available in quantity, either as a transportable product from overseas natural gas conversion processes, or as a product from large scale coal, shale, or tar sand gasification. It also can utilize carbon monoxide (in combination with hydrogen contributors such as water or methanol), which gas is readily available from refinery regeneration flue gas (or other incomplete combustion processes), or from coal, shale, or tar sand gasification. Highly efficient recycle of unused hydrogen contributors can also be effected.

A particularly attractive feature of this invention is concerned with converting whole crude hydrocarbon materials. That is, a whole crude may be utilized as the charge with the light end portion thereof constituting a part of the "low molecular weight hydrogen contributor" alone or in combination with added methanol or other hydrogen contributing light materials and the heavier end portion of the whole crude constituting the "high molecular weight feedstock".

It is anticipated that as a result of the processing concepts herein defined, requirements for reforming and alkylation can be greatly reduced, thus saving the petroleum refiner investment and operating cost.

The combination reactions comprising this invention are effective in removing sulfur, oxygen, nitrogen and metal contaminants found in a whole crude or a heavy hydrocarbon portion thereof.

The chemical-conversion of this invention is accomplished at temperatures within the range of 400°F. up to about 1400°F. and more usually within the range of 700°F. to about 1200°F. at pressures selected from within the range of below atmospheric up to several hundred pounds but normally less than 100 psig. Preferred conditions include a temperature within the range of about 800°F. to about 1150°F. and pressures within the range of atmospheric to about 100 psig.

In an operation embodying the concepts of this invention using methanol in combination with a gas oil type of hydrocarbon charge stock, a ratio of methanol to hydrocarbon charge passed to the cracking or conversion operation will vary considerably and may be selected from within the range of from about 0.01 to about 5, it being preferred to maintain the ratio within the range of about 0.05 to about 0.30 on a stoichiometric weight basis. However, this may vary depending upon the hydrogen deficiency of the high molecular weight hydrocarbon charge, the amount of sulfur, nitrogen and oxygen in the oil charge, the amount of polycyclic aromatics, the type of catalyst employed, and the level of conversion desired. It is preferred to avoid providing any considerable or significant excess of methanol with the charge because of its tendency to react with itself under some conditions.

In a specific embodiment, this invention includes the catalytic cracking of high boiling residual hydrocarbons in the presence of hydrogen and carbon-hydrogen contributing materials in the presence of crystalline zeolite conversion catalysts particularly performing the chemical reactions of cracking, hydrogen redistribution, olefin cyclization and chemical reaction providing mobile hydrogen in one of several different forms and suitable for completing desired hydrogen transfer reactions. The chemical reactions desired are particularly promoted by a mixture of large and small pore crystalline zeolites in the presence of hydrogen donor materials such as methanol or a mixture of reactants which will form methanol under, for example, Fischer-Tropsch, or other processing conditions. The conditions of cracking may be narrowly confined within the range of 900°F. to 1100°F. at a hydrocarbon residence time within the range of 0.5 second to about 5 minutes. The catalyst employed is selected from a rare earth exchanged "X" or "Y" faujasite type crystalline zeolite material, a mordenite or ZSM-5 type crystalline zeolite either component of which is employed alone in an amount within the range of 2 weight percent up to about 15 weight percent dispersed in a suitable matrix material. The faujasite and mordenite crystalline zeolites may be employed alone, together or in admixture in any combination thereof with a ZSM-5 type of crystalline zeolite supported by the same matrix or by a separate silica-clay matrix containing material.

DISCUSSION OF SPECIFIC EMBODIMENTS

EXAMPLE 1

A heavy vacuum gas oil (HVGO) was used as the hydrocarbon feed in the cracking operations of the following examples and provided the following inspections: API gravity (60°F) 20.3; refractive index, 1.5050; average molecular weight 404; weight percent hydrogen, 11.81; weight percent sulfur, 2.69; weight percent total nitrogen, 0.096; basic nitrogen (p.p.m.), 284; metals; less than 2 p.p.m.; boiling range, 748°F. (10%) – 950°F. (90%). The methanol used with the hydrocarbon feed in comparative runs was C.P. grade methanol.

In run B of Table I presented below, a mixture of methanol (16.5 weight percent based on HVGO) and (HVGO) heavy vacuum gas oil identified above were pumped from separate reservoirs to the inlet of a feed preheater of a 30 ft. bench scale riser FCC unit. The feed materials were intimately mixed in the feed preheater at 790°F. and then admitted to the riser inlet, where the hot (1236°F) equilibrium catalyst (15 wt.% REY) (67.5 FAI) (fluid activity index) was admitted and catalytic reaction allowed to occur. The catalyst Fluid Activity Index (FAI) is defined as the conversion obtained to provide a 356°F. 90% ASTM gasoline product processing a Light East Texas Gas Oil (LETGO) at a 2 c/o, 850°F. 6 WHSV for 5 minutes on stream time. Conversion is defined as 100-cycle oil product. The riser reactor inlet and mix temperature were 1000°F., ratio of catalyst to oil (Oil = HVGO + $CH_3OH$) by weight was 4.07, catalyst residence time was 4.8 sec., riser inlet pressure was 30 psig, and ratio of catalyst residence time to oil residence time (slip) was 1.26. The riser effluent was passed through a steam stripping chamber, and the gaseous effluent was separated from spent catalyst (1.02 weight percent carbon). The gaseous and liquid products were collected and separated by distillation and analyzed. Data for the operating conditions and mass balance are shown in Table I below.

TABLE I-A

HEAVY VACUUM GAS OIL WITH/WITHOUT METHANOL
REACTION CONDITIONS AND MASS BALANCE
15% REY CATALYST

| | Run A | Run B |
|---|---|---|
| OPERATING CONDITIONS | | |
| Reactor Inlet Temp., °F. | 1000 | 1000 |
| Oil Temp., °F. | 790 | 790 |
| Catalyst Inlet Temp., °F. | 1236 | 1237 |
| Catalyst/oil (Wt/Wt) Ratio[b] | 3.96 | 4.07 |
| Catalyst Residence Time, Sec. | 4.87 | 4.80 |
| Reactor Pressure, Inlet, psig | 30 | 30 |
| Carbon, Spent Catalyst, % Wt. | .963 | 1.022 |
| Sulfur, Spent Catalyst, % Wt. | .0173 | .0204 |
| Slip Ratio | 1.27 | 1.26 |
| Catalyst | ←15% REY→ | |
| | FAI 67.5, burned white | |
| YIELDS (NLB ON TOTAL FEED) | | |
| Conversion, % Vol.[a] | 65.23 | 63.20 |
| $C_5$+ Gasoline, % Vol. | 53.53 | 50.06 |
| Total $C_4$, % Vol. | 13.03 | 9.90 |
| Dry Gas, % Wt. | 7.36 | 9.92 |
| Coke, % Wt. | 4.11 | 4.82 |
| Gaso. Efficiency, % Vol. | 82.06 | 79.2 |
| Gasoline R+O, Raw Octane | 87.8 | 89.5 |
| $H_2$ Factor | 27 | 15 |
| Recovery, % Wt | 96.83 | 102.49[c] |
| Wt.% $CH_3OH$, % of Heavy Vaccum Gas Oil | — | 16.5 |
| Molar ratio, $CH_3OH$/HVGO | — | ~2.1 |

[a] 356°F. at 90% cut point
[b] On $CH_3OH$ + HVGO
[c] Includes added mass from $CH_3OH$ reaction.

| Detailed Mass Balance[a] | | |
|---|---|---|
| $H_2S$, % Wt. | .58 | .10 |
| $H_2$, % Wt. | .05 | .08 |
| $C_1$, % Wt. | .89 | 3.83 |
| $C_2$=, % Wt. | .56 | .84 |
| $C_2$, % Wt. | .75 | .92 |
| $C_3$=, % Vol. | 6.26 | 5.75 |
| $C_3$, % Vol. | 1.86 | 1.67 |
| $C_4$=, % Vol. | 7.28 | 6.67 |
| i-$C_4$, % Vol. | 4.65 | 2.53 |
| n-$C_4$, % Vol. | 1.10 | 0.71 |
| $C_5$=, % Vol. | 5.54 | 5.33 |
| i-$C_5$, % Vol. | 4.36 | 2.29 |
| n-$C_5$, % Vol. | 0.89 | 0.58 |
| $C_5$+ Gaso., % Vol. | 53.53 | 50.06 |
| Cycle Oil, % Vol. | 34.77 | 36.85 |
| Coke, % Wt. | 4.11 | 4.82 |

[a] Note: Selectivities are based on total products arising from methanol + HVGO reaction.

TABLE I-B

GASOLINE INSPECTIONS

| | Run A | Run B |
|---|---|---|
| Sp. Grav., 60°F. | .7495 | .7491 |
| API Grav., 60° | 57.3 | 57.4 |
| Alkylates % Vol. | 22.63 | 18.18 |
| $C_5$+ Gasoline + alkylate, % Vol. | 76.16 | 59.29 |
| Outside i-$C_4$ required, % Vol. | 10.65 | 10.04 |
| R+O Octane No., Raw | 87.8 | 89.5 |
| Hydrocarbon Types $C_5$— Free, vol.% | | |
| Paraffins | 33.1 | 18.9 |
| Olefins | 24.1 | 43.6 |
| Naphthenes | 12.1 | 7.2 |
| Aromatics | 30.2 | 30.2 |
| Distillation, °F. | | |
| 10% | 79 | 94 |
| 50% | 222 | 233 |
| 90% | 349 | 363 |

TABLE I-C

CYCLE OIL INSPECTIONS

| | Run A | Run B |
|---|---|---|
| Sp. Grav., 60°F. | .9984 | .9746 |

TABLE I-C-continued

CYCLE OIL INSPECTIONS

| | Run A | Run B |
|---|---|---|
| API Grav., 60°F. | 10.23 | 13.69 |
| Sulfur, % Wt. | 4.45 | 4.24 |
| Hydrogen, % Wt. | 8.21 | 9.18 |
| Hydrocarbon Type, Wt.% | | |
| Paraffins | 7.3 | 8.8 |
| Mono-naphthenes | 2.3 | 2.5 |
| Poly-naphthenes | 4.4 | 5.9 |
| Aromatics | 86.1 | 82.8 |
| Naphthene/Aromatic wt/wt ratio | .078 | 0.10 |
| Distillation, °F. | | |
| 10% | 470 | 429 |
| 50% | 695 | 540 |
| 90% | 901 | 794 |
| Aromatic Breakdown, Normalized, Wt.-% | | |
| Mono-aromatics | 17.9 | 26.3 |
| Di-aromatics | 37.2 | 37.8 |
| Tri-aromatics | 10.1 | 9.1 |
| Tetra-aromatics | 8.3 | 5.5 |
| Pento-aromatics | 1.3 | 1.1 |
| Sulfur Compounds | | |
| Benzothiophene | 10.2 | 8.3 |
| Dibenzothiophene | 10.4 | 6.2 |
| Naphthobenzothiophene | 4.6 | 3.3 |
| Other | 0.2 | 2.4 |
| Ratio, Diaromatics/Benzothiophene | 3.65 | 4.55 |

A control run A presented in Table I was made with the identified HVGO alone (no methanol present) in the same manner identified above with Run B. An analysis of the comparative data obtained with the REY catalyst show the following improvements associated with the use of methanol as a "low molecular weight hydrogen donor" when intimately mixed with and cracked with HVGO in a riser fluid catalyst cracking operation.

1. Much higher levels of aromatics + olefins in the gasoline (aromatics and olefins are the major contributors to octane number in gasoline).
2. Higher octane (89.5 R+O with $CH_3OH$ vs 87.8 R+O without $CH_3OH$).
3. Lower percent sulfur in fuel oil (4.24 wt.% with $CH_3OH$ vs 4.45 wt.% without $CH_3OH$).
4. Higher percent hydrogen in fuel oil (9.18 wt.% with $CH_3OH$ vs 8.21 wt.% without $CH_3OH$).
5. Higher naphthene/aromatic ratios in fuel oil 0.10 with methanol vs 0.08 without methanol).
6. Higher ratios of Diaromatics/Benzothiophenes (4.55 with $CH_3OH$, 3.65 without $CH_3OH$); this indicates that increased desulfurization occurs with methanol.

EXAMPLE 2

In this example, the heavy vacuum gas oil identified in Example 1 was cracked with and without the presence of methanol with a catalyst mixture comprising a 2% REY crystalline zeolite in combination with a 10% ZSM-5 crystalline zeolite and supporting matrix (silica-clay). The method of operation was carried out similarly to that identified with respect to Example 1. Table II-A below provides the reaction conditions and mass balance obtained for Runs C (no methanol) and Run D (with methanol). Table II-B provides the gasoline inspection data for runs C and D and Table II-C provides the cycle oil inspection data for these two runs.

Table II-A

REACTION CONDITIONS AND MASS BALANCE

| | Run C | Run D |
|---|---|---|
| OPERATING CONDITIONS | | |
| Reactor Inlet Temp., °F. | 900 | 900 |
| Oil Temp., °F. | 500 | 500 |
| Catalyst Inlet Temp., °F. | 1110 | 1102 |
| Catalyst/Oil (Wt/Wt) Ratio | 6.68 | 6.81[a] |
| Catalyst Residence Time, Sec. | 4.70 | 6.11 |
| Reactor Pressure, Inlet, psig | 30 | 30 |
| Carbon, Spent Catalyst, %Wt | .285 | .342 |
| Sulfur, Spent Catalyst, %Wt | .0091 | .0006 |
| Slip Ratio | 1.24 | 1.24 |
| Catalyst | ←2% REY +10% ZSM-5 → | |
| YIELDS (NLB ON TOTAL FEED) | | |
| Conversion, % Vol[a] | 44.16 | 42.66[b] |
| $C_5$+ Gasoline, % Vol. | 33.12 | 35.15 |
| Total $C_4$, % Vol | 12.04 | 6.59 |
| Dry Gas, % Wt | 5.47 | 5.29 |
| Coke, % Wt | 2.08 | 2.83 |
| Gaso. Efficiency, % Vol | 75.0 | 82.39 |
| Gasoline R+O, Raw Octane No. | — | — |
| $H_2$ Factor | 99 | 25 |
| Recovery, % Wt. | 94.9 | 95.10 |

[a] 356°F at 90% cut point
[a] on $CH_3OH$ + HVGO
[b] based on HVGO only

| | Run C | Run D |
|---|---|---|
| Wt.% $CH_3OH$, % of Heavy-72-D-611 Vacuum Gas Oil | — | 16.0 |
| Molar Ratio, $CH_3OH$/HVGO | — | ~2.1 |
| Detailed Mass Balance | | |
| $H_2S$, % Wt. | .19 | .09 |
| $H_2$, % Wt. | .06 | .06 |
| $C_1$, % Wt. | .19 | 1.68 |
| $C_2^=$, % Wt. | .20 | .33 |
| $C_2$, % Wt. | .22 | .36 |
| $C_3^=$, % Vol. | 7.47 | 4.60 |
| $C_3$, % Vol. | .80 | .34 |
| $C_4^=$, % Vol. | 8.13 | 5.00 |
| $i-C_4$, % Vol. | 3.34 | 1.13 |
| $n-C_4$, % Vol. | .57 | .46 |
| $C_5^=$, % Vol. | 5.82 | 3.98 |
| $i-C_5$, % Vol. | 2.45 | 1.05 |
| $n-C_5$, % Vol. | .51 | .23 |
| $C_5$+ Gaso., % Vol. | 33.12 | 35.15 |
| Cycle Oil, % Vol. | 55.84 | 57.34 |
| Coke, % Wt. | 2.08 | 2.83 |
| Gaso./coke(wt/wt) Ratio | 12.82 | 10.14 |
| Gaso./gas | 4.87 | 5.43 |

Table II-B

GASOLINE INSPECTIONS

| | Run C | Run D |
|---|---|---|
| Sp. Grav., 60°F. | .7487 | .7620 |
| API Grav., 60°F. | 57.5 | 54.2 |
| Alkylate, % Vol. | 26.05 | 16.03 |
| $C_5$+ Gaso. + Alky.,% Vol. | 59.17 | 51.19 |
| Outside $i-C_4$ Required, % Vol. | 14.26 | 9.69 |
| R+O Octane No., Raw | — | — |
| Hydrocarbon Type, $C_5$-Free, Vol.% | | |
| Paraffins | 23.6 | 10.4 |
| Olefins | 32.4 | 57.3 |
| Naphthenes | 18.1 | 5.9 |
| Aromatics | 25.7 | 26.4 |
| Distillation, °F. | | |
| 10% | — | — |
| 50% | — | — |
| 90% | — | — |

Table II-C

CYCLE OIL INSPECTIONS

| | Run C | Run D |
|---|---|---|
| Sp. Grav., 60°F. | .9701 | .9580 |
| API Gravity, 60°F. | 14.4 | 16.2 |
| Sulfur, % Wt. | 4.04 | 3.39 |
| Hydrogen, % wt. | 10.13 | 10.64 |
| Hydrocarbon Type, Wt.% | | |
| Paraffins | 15.7 | 16 |
| Mono-naphthenes | 6.9 | 7.8 |
| Poly-naphthenes | 9.2 | 10.1 |
| Aromatics | 68.3 | 66.2 |
| Naphthene/Aromatic (Wt/Wt) Ratio | .23 | .27 |
| Distillation, °F. | | |
| 10% | 536 | 518 |
| 50% | 791 | 756 |
| 90% | 921 | 900 |

Table II-C-continued

| CYCLE OIL INSPECTIONS | Run C | Run D |
|---|---|---|
| Aromatic Breakdown, Normalized, Wt.% | | |
| Mono-aromatics | 23.4 | 34.2 |
| Di-aromatics | 29.0 | 32.1 |
| Tri-aromatics | 11.0 | 10.0 |
| Tetra-aromatics | 8.9 | 5.5 |
| Penta-aromatics | 1.9 | .9 |
| Sulfur Compounds | | |
| Benzothiophenes | 8.7 | 6.7 |
| Dibenzothiophenes | 8.3 | 5.6 |
| Naphthobenzothiophenes | 5.3 | 2.0 |
| Other | 3.8 | 2.9 |
| Ratio, Diaromatics/Benzothiophene | 3.33 | 4.79 |

It will be observed from Table II-A above that the conversion of the heavy gas oil feed with methanol produced significantly higher yields of $C_5+$ gasoline at a slightly lower conversion level than occurred in the control Run A for comparative purposes. Furthermore, the yield of $C_4$'s was lower, and the gasoline efficiency was much higher with methanol in the feed. An examination of the mass balance yields shows the methanol operation to be associated with higher gasoline and fuel oil yields at the expense of $C_4$ and lower boiling hydrocarbons. Also from the gasoline product inspection Table II-B, it is evident that the gasoline product of the methanol operation will be of a higher octane rating than the gasoline product of Run C, because of increased yields of olefins and aromatics. On the other hand, the cycle oil inspection data of Table II-C, shows lower sulfur compounds in the product of Run C (with methanol); a higher hydrogen content, a higher naphthene to aromatic ratio; less polycyclics and higher aromatics and a higher ratio of diaromatics/benzothiophene indicating that hydrogen transfer has occurred thus producing a better fuel.

EXAMPLE 3

In this example, the heavy vacuum gas oil identified in Example 1 was converted in the presence of methylal which is a methyl ether of formaldehyde: $(CH_3O)_2CH_2$. The catalyst employed was a mixture comprising 2% REY crystalline zeolite in combination with 10% ZSM-5 type of crystalline zeolite supported by a silica-clay matrix. The method of operation was performed in the same manner identified in Example 1 at the operating conditions provided in Table III below. In the table comparative runs are shown with no promoter Run C and methanol promoter Run D.

TABLE III-A

COMPARISON OF REACTING HVGO WITH METHYLAL AND WITH/WITHOUT METHANOL REACTION CONDITIONS AND MASS BALANCE

| | Run C[d] | Run E[b] | Run D[c] |
|---|---|---|---|
| OPERATING CONDITIONS | | | |
| Reactor Inlet Temp., °F. | 900 | 900 | 900 |
| Oil Temp., °F. | 500 | 500 | 500 |
| Catalyst Inlet Temp., °F. | 1110 | 1102 | 1102 |
| Catalyst/Oil (Wt/Wt) Ratio | 6.68 | 6.72[b] | 6.81[e] |
| Catalyst Residence Time, Sec. | 4.70 | 6.02 | 6.11 |
| Reactor Pressure, Inlet, psig | 30 | 30 | 30 |
| Carbon, Spent Catalyst, %Wt. | .285 | .601 | .342 |
| Sulfur, Spent Catalyst, %Wt. | .0091 | .0145 | .0006 |
| Slip Ratio | 1.24 | 1.28 | 1.24 |
| Catalyst | 2% REY + 10% ZSM-5 | | |
| YIELDS(NLB ON TOTAL FEED)[f] | | | |
| Conversion, % Vol[a] | 44.16 | 42.14 | 42.66 |
| $C_5+$ Gasoline, % Vol. | 33.12 | 31.51 | 35.15 |
| Total $C_4$, % Vol. | 12.04 | 6.46 | 6.59 |
| Dry Gas, % Wt. | 5.47 | 5.78 | 5.29 |
| Coke, % Wt. | 2.08 | 4.90 | 2.83 |
| Gaso. Efficiency, % Vol. | 75.0 | 74.8 | 82.39 |
| Gasoline R+O, Raw Octane No. | — | — | — |
| $H_2$ Factor | 99 | 18 | 25 |
| Recovery, % Wt. | 94.9 | 98.1 | 95.10 |
| Wt.% Promoter % of HVGO | 0 | 16.0 | 16.0 |
| Molar Ratio, Promoter/HVGO | 0 | 0.85 | 2.1 |

[a]356°F. at 90% cut point
[b]Methylal = methyl ether of formaldehyde
[c]Methanol
[d]Control Run — no promoter
[e]On promoter + HVGO (heavy vacuum gas oil)
[f]On HVGO feed only (NLB = no less basis)

| Detailed Mass Balance | | | |
|---|---|---|---|
| $H_2S$, % Wt. | .19 | 0.1 | .09 |
| $H_2$, % Wt. | .06 | .05 | .06 |
| $C_1$, % Wt. | .19 | 1.89 | 1.68 |
| $C_2=$, % Wt. | .20 | .35 | .33 |
| $C_2$, % Wt. | .22 | .42 | .36 |
| $C_3=$, % Vol. | 7.47 | 4.04 | 4.60 |
| $C_3$, % Vol. | .80 | 1.28 | .34 |
| $C_4=$, % Vol. | 8.13 | 4.83 | 5.00 |
| i-$C_4$, % Vol. | 3.34 | 1.27 | 1.13 |
| n-$C_4$, % Vol. | .57 | .36 | .46 |
| $C_5=$, % Vol. | 5.82 | 3.88 | 3.98 |
| i-$C_5$, % Vol. | 2.54 | 1.34 | 1.05 |
| n-$C_5$, % Vol. | .51 | .22 | .23 |
| $C_5+$ Gaso., % Vol. | 33.12 | 31.51 | 35.15 |
| Cycle Oil, % Vol. | 55.84 | 57.86 | 57.34 |
| Coke, % Wt. | 2.08 | 4.90 | 2.83 |

TABLE III-B

| GASOLINE INSPECTIONS | Run C | Run E | Run D |
|---|---|---|---|
| Sp. Grav., 60°F. | .7487 | .7580 | .7620 |

TABLE III-B-continued

| GASOLINE INSPECTIONS | Run C | Run E | Run D |
|---|---|---|---|
| API Grav., 60°F. | 57.5 | 55.18 | 54.2 |
| Alkylate, % Vol. | 26.05 | 14.84 | 16.03 |
| $C_5+$ Gaso. + Alky., % Vol | 59.17 | 46.35 | 51.19 |
| Outside i-$C_4$ Required, % Vol. | 14.26 | 8.72 | 9.69 |
| R+O Octane No., Raw | — | — | — |
| Hydrocarbon Type, $C_5$–Free Vol.% | | | |
| Paraffins | 23.6 | 11.8 | 10.4 |
| Olefins | 32.4 | 49.9 | 57.3 |
| Naphthenes | 18.1 | 6.3 | 5.9 |
| Aromatics | 25.7 | 32.0 | 26.4 |
| Distillation, °F. | | | |
| 10% | — | — | — |
| 50% | — | — | — |
| 90% | — | — | — |

TABLE III-C

| CYCLE OIL INSPECTIONS | Run C | Run E | Run D |
|---|---|---|---|
| Sp. Grav., 60°F. | .9701 | .9594 | .9580 |
| API Gravity, 60°F. | 14.4 | 16.0 | 16.2 |
| Sulfur, % Wt. | 4.04 | 3.306 | 3.39 |
| Hydrogen, % Wt. | 10.13 | 10.57 | 10.64 |
| Hydrocarbon Type, Wt.% | | | |
| Paraffins | 15.7 | 15.5 | 16 |
| Mono-naphthenes | 6.9 | 7.6 | 7.8 |
| Poly-naphthenes | 9.2 | 9.7 | 10.1 |
| Aromatics | 68.3 | 67.3 | 66.2 |
| Naphthene/Aromatic (Wt/Wt) Ratio | .23 | 0.26 | .27 |
| Distillation, °F. | | | |
| 10% | 536 | 523 | 518 |
| 50% | 791 | 749 | 756 |
| 90% | 921 | 903 | 900 |
| Aromatic Breakdown, Normalized, Wt.% | | | |
| Mono-aromatics | 23.4 | 29.2 | 34.2 |
| Di-aromatics | 29.0 | 32.2 | 32.1 |
| Tri-aromatics | 11.0 | 11.1 | 10.0 |
| Tetra-aromatics | 8.9 | 6.0 | 5.5 |
| Penta-aromatics | 1.9 | 1.2 | 0.9 |
| Sulfur Compounds | | | |
| Benzothiophenes | 8.7 | 6.9 | 6.7 |
| Dibenzothiophenes | 8.3 | 5.6 | 5.6 |
| Naphthobenzothiophenes | 5.3 | 3.1 | 2.0 |
| Other | 3.8 | 4.6 | 2.9 |
| Ratio, Diaromatics/Benzo-thiophene | 3.33 | 4.67 | 4.79 |

It will be observed upon examination of the data of Table III that a significant improvement in gasoline quality and cycle oil quality is obtained with either methylal or methanol as a promoter. The gasoline product is shown to have much lower paraffins, much higher olefins and much higher aromatics than obtained by Run C with no promoter. Therefore the gasoline product obtained with the promoter is of a higher octane.

The cycle oil product inspection shows lower sulfur and higher hydrogen in the product of Runs E and D using methylal and methanol as a promoter. In addition there is a higher naphthene/aromatic ratio, lower amounts of the higher molecular weight polyaromatics, more monoaromatics, higher ratio of diaromatics to benzothiophenes — all of which indicate a better quality of fuel oil.

EXAMPLE 4

The cracking of shale oil in the presence of methanol in a bench riser FCC pilot plant at 1000°F., using a 2% REY — 10% mordenite fluid cracking catalyst was accomplished as provided below.

The shale oil used showed these inspections: API gravity (60°F), 22.6; refractive index (70°C), 1.494; molecular wt., 321; wt. % hydrogen, 11.37; wt. % sulfur, 0.764; wt.% total nitrogen, 1.81; basic nitrogen (wt.%) 1.05; metals: (p.p.m.) 2.0; boiling range, 451°F. (10%) – 988°F. (81%). Methanol was C.P. grade, Baker.

Methanol (16.2 wt.% based on shale oil) and shale oil were pumped from separate reservoirs to the inlet of the feed preheater of a 30 ft. bench scale riser FCC unit. Stocks were intimately mixed in the feed preheater at 510°F. and then admitted to the riser inlet, where hot (1218°F.) catalyst (2% REY — 10% mordenite in matrix, burned-white, 38.6 FAI) was admitted and catalystic reaction allowed to occur. Riser reactor inlet and mix temperature were 1000°F., ratio of catalyst to oil (Oil = Shale oil + $CH_3OH$) was 6.83, catalyst residence time was 5.10 sec., riser inlet pressure was 30 psig, and ratio of catalyst residence time to oil residence time (slip) was 1.24. Riser effluent then passed through a steam stripping chamber, and a gaseous effluent was separated from spent catalyst (0.837 wt. % carbon) and the gaseous and liquid products collected, separated by distillation and analyzed. This run is numbered H-653. Data for the operating conditions and mass balance, gasoline inspections, and cycle oil inspections are shown in Tables 4, 5, 6 and 7, respectively. Feed inspections are shown in Table 8.

Table 4

Reaction of Shale Oil With Methanol Over Zeolite Catalyst

| Reaction Conditions | H-652 | H-653 |
|---|---|---|
| Reactor Inlet Temp., °F. | 1000° | 1000° |
| Oil Feed Temp., °F. | 510 | 510 |
| Catalyst Inlet Temp., °F. | 1238 | 1218 |
| Catalyst/Oil (wt/wt) Ratio | 6.32 | 6.3[a] |
| Catalyst Residence Time, Sec. | 4.77 | 5.10 |
| Reactor Inlet Pressure, psig | 30 | 30 |
| Moles of Product/Mole Feed (ex coke) | 2.426 | 0.983 |
| Oil Partial Pressure, Inlet, psia | 24.3 | 31.9 |
| Carbon, Spent Catalyst, % wt. | 0.913 | 0.837 |
| Sulfur, Spent Catalyst, % wt. | — | — |
| Slip Ratio | 1.24 | 1.24 |
| Nitrogen, Spent Catalyst, % wt. | 0.058 | 0.048 |
| Methanol, wt.% of Shale Oil | — | 16.2 |
| Molar Ratio, Methanol/Shale Oil | — | 1.62 |
| Catalyst | ←2% REY – 10% Mordenite → burned white, FAI = 38.55 | |

[a] Based on $CH_3OH$ + Shale Oil

Table 5

Product Selectivities (Basis: 100g Shale Oil Feed)

| Run | H-652 | H-653 |
|---|---|---|
| Change In | | |
| Shale Oil, g | 100.0 | 100.0 |
| Methanol, g | — | 7.1 |
| Total, g | 100.0 | 107.1 |
| Products Out, g | | |
| $C_5+$ Gasoline[a)(b)] | 28.41 | 28.70 |
| Total $C_4$ | 1.95 | 1.80 |
| Dry Gas | 6.78 | 8.64 |
| Coke | 6.27 | 7.18 |
| Cycle Oil[(a)(b)] | 56.58 | 60.78 |
| Light Product Breakdown, g | | |
| $H_2S$ | .03 | .01 |

Table 5-continued

| Product Selectivities (Basis: 100g Shale Oil Feed) | | |
|---|---|---|
| $H_2$ | .06 | .12 |
| $C_1$ | 1.59 | 2.69 |
| $C_2=$ | 1.25 | 1.77 |
| $C_2$ | 1.35 | 1.31 |
| $C_3=$ | 1.58 | 1.68 |
| $C_3$ | .92 | 1.07 |
| $C_4=$ | 1.52 | 1.40 |
| $i-C_4$ | .24 | .22 |
| $n-C_4$ | .19 | .17 |
| $C_5=$ | 1.33 | 1.16 |
| $i-C_5$ | .21 | .22 |
| $n-C_5$ | .25 | .14 |
| Recovery wt.% of feed | 92.54 | 88.41 |
| $H_2$-Factor | 16 | 21 |
| Gasoline Efficiency, Apparent[c] | 65.4 | 73.2 |

[a] Yields are corrected for gasoline in cycle oil and cycle oil in gasoline (from simple distillation).
[b] ~ 356°F. at 90% ASTM cut point.
[c] Defined here as (g. gasoline/100 g. oil - g. cycle oil) × 100.

Table 6

| Gasoline Inspections | | |
|---|---|---|
| Run | H-652 | H-653 |
| Sp. Grav., 60°F. | .7858 | .7797 |
| API Grav., 60°F. | 48.6 | 50.0 |
| Nitrogen, % wt. | 0.71 | 0.63 |
| Aromatics + Olefins (by acid-treat) | 78.5 | 83.0 |
| Hydrocarbon Type, $C_5$-Free, vol.% | | | |
| Paraffins | 26.0 | 23.3 | −2.7 |
| Olefins | 36.6 | 39.6 | +3.0 |
| Naphthenes | 5.2 | 6.0 | + .8 |
| Aromatics | 32.3 | 30.8 | −1.5 |
| % H | 13.00 | 13.00 | |
| M.W. | 120.15 | 120.78 | |
| Distillation, °F. as Cut | | | |
| 10% | 146 | 151 | |
| 50% | 297 | 302 | |
| 90% | 432 | 435 | |

Table 7

| Cycle Oil Inspections | | |
|---|---|---|
| | H-652 | H-653 |
| Sp. Grav., 60°F. | .9410 | .9401 |
| API Gravity, 60°F. | 18.8 | 19.0 |
| Sulfur, % Wt. | | |
| Hydrogen, % Wt. | 10.84 | 10.81 |
| Nitrogen, % Wt. | 2.00 | 1.95 |
| Refractive Index, $N_D 70°$ | 1.513 | 1.512 |
| Distillation, °F. as cut | | |
| 10% | 459 | 443 |
| 50% | 640 | 642 |
| 90% | 907 | 932 |
| Aromatic Breakdown, Normalized, Wt.% | | |
| Mono-aromatics | | |
| Di-aromatics | | |
| Tri-aromatics | | |
| Tetra-aromatics | | |
| Penta-aromatics | | |
| Sulfur Compounds | | |
| Benzothiophenes | | |
| Dibenzothiophenes | | |
| Naphthobenzothiophenes | | |
| Other | | |
| Ratio, Diaromatics/Benzothiophene | | |

Table 8

| Inspections, Full Syncrude Shale Oil 67D2453 | | | | | |
|---|---|---|---|---|---|
| Description | 67D2453 Shale Oil Full Syn | Distillation | | (Type) | D 1160 |
| | | IBP, | °F | | 343 |
| Physical Properties | | 5 Vol %, | °F | | 402 |
| Gravity °API, 60°F | 22.6 | 10 Vol %, | °F | | 451 |
| Sp. Gravity, 60°F. | .918 | 20 Vol %, | °F | | 544 |
| Refractive Index, 70°F. | 1.494 | 30 Vol %, | °F | | 620 |
| Density, 70°C | .8810 | 40 Vol %, | °F | | 696 |
| Molecular Wt. (V.P.) | 321 | 50 Vol %, | °F | | 766 |
| | | 60 Vol %, | °F | | 831 |
| Chemical Analyses | | 70 Vol %, | °F | | 900 |
| | | 80 Vol %, | °F | | 982 |
| Hydrogen, % Wt. | 11.37 | 90 Vol %, | °F | | (81)988 |
| Sulfur, % Wt. | .764 | 95 Vol %, | °F | | |
| Nitrogen, % Wt. | 1.81 | EP, | °F | | |
| Basic Nitrogen, % Wt. | 1.05 | | | | |
| Metals, ppm | | | | | |
| Nickel | 1.5 | | | | |
| Vanadium | .5 | | | | |
| Molecular Type, Wt.% | | | | | |
| Paraffins | 11.7 | | | | |
| Naphthenes | 11.6 | | | | |
| Aromatics | 76.62 | | | | |
| Aromatic Breakdown, Normalized, Wt.% | | | | | |
| Mono | 56.9 | | | | |
| Di | 25.8 | | | | |
| Tri | 7.1 | | | | |
| Tetra | 0.5 | | | | |
| Penta | 1.5 | | | | |
| Others | 8.1 | | | | |

A similar (control) run was made with shale oil only, with no methanol present (H-652). Our analyses show the following improvements associated with the use of methanol as "low molecular weight hydrogen transfer agent", when intimately mixed with and co-reacted with methanol under riser FCC conditions.

1. Very slightly better gasoline yield: $\Delta = +0.29$ wt.%
2. Much greater gasoline efficiency: 73.2% vs 65.4
3. Improved gasoline quality: mass spectrographic "PONA" analyses show less paraffins, more olefins:

| HC Type | $\Delta$, vol. % |
|---|---|
| P | − 2.7 |
| O | + 3.0 |
| N | + .8 |
| A | − 1.5 |

These data, plus the high level of aromatics + olefins obtained by acid treatment technique, suggests that the gasoline from H-653 may be expected to provide a higher octane (R+O) number.

There is less nitrogen in the gasoline: (0.63 vs 0.71 wt.%). Thus a lesser tendency to gum- and sludge-formation may be expected.

4. Slightly higher yields of ethylene and propylene; these provide a useful feed for alkylation.

5. More $H_2$ gas: ($\Delta = 0.6$ wt. %). This process-derived $H_2$-gas can lessen refinery needs for outside $H_2$ purchase or reduce need for $H_2$-plant construction. Excess $H_2$ can be used in pretreaters, hydrotreaters, etc.

6. Higher ratio i-$C_5$/n-$C_5$: 1.57 vs 0.84; this provides strong contributions to octane number.

7. Very slightly less nitrogen in cycle oil.

8. Less nitrogen in coke on catalyst (0.048 vs. 0.058 wt.%); a lowered tendency towards emission of pollutant nitrogen oxides will result.

The drawing is a schematic arrangement in elevation of the process combination for converting high nitrogen oil stocks and the recovery of products therefrom.

The current practice for removing nitrogen poisons from a high nitrogen containing hydrocarbon feedstock generally involves a hydrotreating step at high hydrogen pressures upstream of the cracking operation. Such a denitrogenation operation is costly, usually involving high hydrogen consumption as well as large capital expenditures for a high pressure reactor and recovery system. If the feedstock passing to cracking is severely hydrogenated, significant losses in gasoline octane may be incurred, thus requiring a subsequent catalytic reforming operation.

In the present concept, cracking a high nitrogen containing hydrocarbon feedstock in the presence of methanol and a zeolite cracking catalyst allows appreciable denitrogenation to occur, thus eliminating or substantially decreasing the requirements for hydrotreating of the product with attendant savings in investment and operating costs. Because the gasoline produced is significantly improved in quality, any subsequent reforming requirements are less severe and because light olefins may be converted with the heavy feed during the cracking operation, isobutane requirements for alkylation will be lower. In addition some significant savings in investment costs can be achieved by combining the crude tower distillation operation with the main fractionator column for the fluid cracking unit.

A particular advantage of the process combination hereinafter discussed is that it occurs at low pressures, that is fluid cracking pressure generally less than 100 psig. The process allows for the highly efficient contact of relatively inexpensive carbon hydrogen fragments with a spectrum of feed molecules of widely different molecular weights in the presence of a high surface area zeolite cracking catalyst providing hydrogen transfer activity thus maximizing facile intermolecular hydrogen transfer reactions and cracking reactions thereby considerably reducing problems due to diffusion/mass transport limitations and/or heat transfer. While it is preferred to carry out the process in a riser or a dilute catalyst phase reactor system, it is also applicable in dense fluid catalyst beds, fixed catalyst beds and downwardly moving catalyst bed operations.

Refering now to the drawing by way of example, a high nitrogen containing feed such as a syncrude from oil shale, tar sands or other high nitrogenous high boiling oil fraction boiling above about 650°F. is introduced to the process by conduit 2 and particularly to the lower portion of a riser conversion zone 4. The high nitrogen containing feed may be combined with a heavy recycle oil introduced by conduit 6 and separated light ends materials providing carbon-hydrogen fragments as discussed herein and recycled by conduit 8. Fresh methanol or other carbon-hydrogen fragment contributing material may also be added by conduit 10 to the oil charged to the riser. The oil charged with the materials above identified is preheated to a temperature of about 150°–800°F. before contact with hot regenerated zeolite catalyst in conduit 12 to form a suspension at a temperature of at least 800°–1150°F. The suspension thus formed is passed upwardly through the riser under conditions providing a hydrocarbon residence time within the range of 1 to 12 seconds. The suspension passed through riser 4 is discharged into a plurality of cyclonic separating means 14 and 16 housed within vessel 18. Gasiform material separated from catalyst particles in cyclonic separation zones is collected in plenum chamber 20 in the upper portion of vessel 18 from which the gasiform material is withdrawn by conduit 22. Catalyst particles separated from gasiform material by cyclonic means 14 and 16 are passed to a catalyst stripping zone in the lower portion of vessel 18. Stripping gas such as steam is introduced to the lower portion of the stripping zone by conduit 24. Stripped catalyst is withdrawn by conduit 26 and passed to catalyst regeneration facilities not shown.

The gasiform effluent recovered from the high temperature cracking operation and withdrawn by conduit 22 is passed to a product fractionator 28 for separation into product streams identified below.

In the diagrammatic arrangement of the drawing, the gasiform effluent introduced to the fractionator tower 28 is separated to recover a clarified slurry oil (CSO) from the bottom of the tower by conduit 30. A heavy recycle oil fraction is recovered by conduit 32 and all or a portion thereof may be recycled to the riser cracking operation by conduit 6. A light fuel oil product is withdrawn by conduit 34. A heavy naphtha fraction is withdrawn by conduit 36. An overhead fraction is withdrawn by conduit 38, cooled in cooler 40 to about 100°F. and then passed by conduit 42 to an accumulator drum 44 wherein a separation is made between gasiform material and liquid material. The liquid material separated in drum 44 is withdrawn by conduit 46 with a portion thereof recycled by conduit 48 as reflux to the upper portion of tower 28. The remaining portion of the recovered liquid is passed by conduit 50 containing pump 52 to a second accumulator drum 54. The gasiform material separated in drum 44 is withdrawn by conduit 56, compressed by compressor 58 and then passed by conduit 60 to accumulator drum 54. Accumulator 54 is maintained at a temperature of about 100°F. and a pressure of about 75 psig. A gasoline or light naphtha fraction is recovered from drum 54 by conduit 62. Gasiform material separated in drum 54 is withdrawn by conduit 64 and passed to light ends processing represented by a box 66.

In the light ends separation section represented by 66, a separation is made which will permit the recovery of gaseous components by conduit 68 and comprising, for example, hydrogen, carbon monoxide, $CH_4$, $C_2H_4$, $C_2H_6$ hydrocarbons; hydrocarbon components by conduit 70 and mainly comprising $C_3$-$C_4$ olefins and paraffins, a water stream recovered by conduit 72 and a methanol-ether stream recovered by conduit 74 and communicating with conduit 8 for recycle of this material to riser 8.

Having thus generally described the invention and discussed specific embodiments in support thereof, it is to be understood that no undue restrictions are to be imposed by reasons thereof except as defined by the following claims.

We claim:

1. A method for converting high nitrogen containing crudes which comprises, mixing the nitrogen containing crude with a low molecular weight carbon hydrogen fragment contributor selected from the group comprising methanol alone or in admixture with $C_2$-$C_5$ olefins, passing the mixture thus formed in contact with a crystalline zeolite cracking catalyst under conversion conditions comprising a temperature within the range of 800° to 1400°F. and an oil charge residence time within the range of 0.5 to 12 sec. and recovering a product of said cracking operation of reduced nitrogen content separate from the catalyst employed.

2. The method of claim 1 wherein the catalyst comprises a mixture of rare earth exchanged "Y" faujasite crystalline zeolite in combination with a mordenite crystalline zeolite.

3. The method of claim 2 wherein the mordenite zeolite is in a greater proportion.

4. The method of claim 1 wherein a heavy cycle oil is separated from the product of the cracking operation and is recycled for admixture with the nitrogen containing crude passed to the cracking operation.

5. The method of claim 1 wherein the mordenite is a dealuminized mordenite.

6. The method of claim 1 wherein the catalyst is provided with a hydrogenating metal component.

7. The method of claim 1 wherein the feed comprises at least 1400 ppm nitrogen.

8. The method of claim 1 wherein the high nitrogen crude is a syncrude obtained from oil shale.

\* \* \* \* \*